United States Patent [19]

Zappia

[11] 4,380,904
[45] Apr. 26, 1983

[54] AIR FUEL ENGINE

[76] Inventor: Anthony T. Zappia, 12374 Brompton Rd., Carmel, Ind. 46032

[21] Appl. No.: 151,137

[22] Filed: May 19, 1980

[51] Int. Cl.³ ............................................. F01B 29/04
[52] U.S. Cl. ...................................... 60/712; 123/1 R
[58] Field of Search ............. 60/712; 123/22, DIG. 7, 123/1 R; 180/165

[56] References Cited

U.S. PATENT DOCUMENTS 962,254  6/1910  Rockwell ........................ 60/712 X
3,513,929  5/1970  Dae Sik Kim ..................... 60/712 X
3,963,379  6/1976  Veno ................................. 60/712 X Primary Examiner—Allen M. Ostrager
Assistant Examiner—Stephen F. Husar
Attorney, Agent, or Firm—J. David Haynes

[57] ABSTRACT

An engine which utilizes gas and compressed air to provide propulsive force. A compressor and a turbo are connected to the engine to provide compressed air for driving the engine to either supplement or replace the gas.

6 Claims, 3 Drawing Figures

AIR FUEL ENGINE

BACKGROUND OF THE INVENTION

There is a pressing need for an engine that will use less fuel and yet provide the same or more propulsive force. Balanced with the need for increased efficiency is an environmental need for less pollutants. These objectives are ever-increasing.

Many inventions, modifications or improvements have addressed themselves to these needs. Exemplary of fuel efficiency is U.S. Pat. No. 4,163,436 to Fugett which provides a greatly improved manner for causing gas to be more completely burned. There have been efforts to modify the style of the engine itself by reducing the power of the engine, or the size of or configuration of the cylinders, per se, or the method for injecting the fuel into the cylinder.

Recent publicity discloses the elimination of spark plus and other gasoline engine parts to provide an engine that operates entirely from compressed air. Such a system is limited in that its fuel, compressed air, is expendable. There is a limited range in which such a vehicle can operate without running out of fuel. In this regard it is very similar to the battery powered motors.

The compressed air tank must be filled with compressed air while the car is at home or while it is at a place where compressed air may be obtained. An engine operated from only compressed air is thus limited in that the distance within which it is limited to is a relatively confided area.

SUMMARY OF THE INVENTION

The present invention relates to an engine which utilizes gas in combination with a compressed fluid such as air for providing forward movement. Gas in initially used to drive the engine. At higher speed compressed air is used to drive selected cylinders to supplement the gas-fired cylinders.

A compressor is rotatably mounted on the engine to provide compressed air at all times to thus maintain a supply of compressed air in the compressed air storage tank. Supplementary to or in place of the compressor, a turbo may be placed in and driven by the gas fired cylinders to provide compressed air. To further increase efficiency, the exhaust of the air-fired cylinders is provided as an input to the compressor to thus provide an input pressure which is different from atmospheric pressure.

Another embodiment envisions an engine which initially operates from gas and then switches from gas to totally air. Air regulating controls causes the engine to operate from the medium, which, from the availability of compressed air or gas, and in view of the speed required, should be most efficient.

It is therefore an object of this invention to provide an engine which is most fuel efficient.

It is a further object of this invention to provide an engine that may be operated with air or a combination of air and gas.

DESCRIPTION OF THE PREFERRED EMBODIMENT

Figure 1:
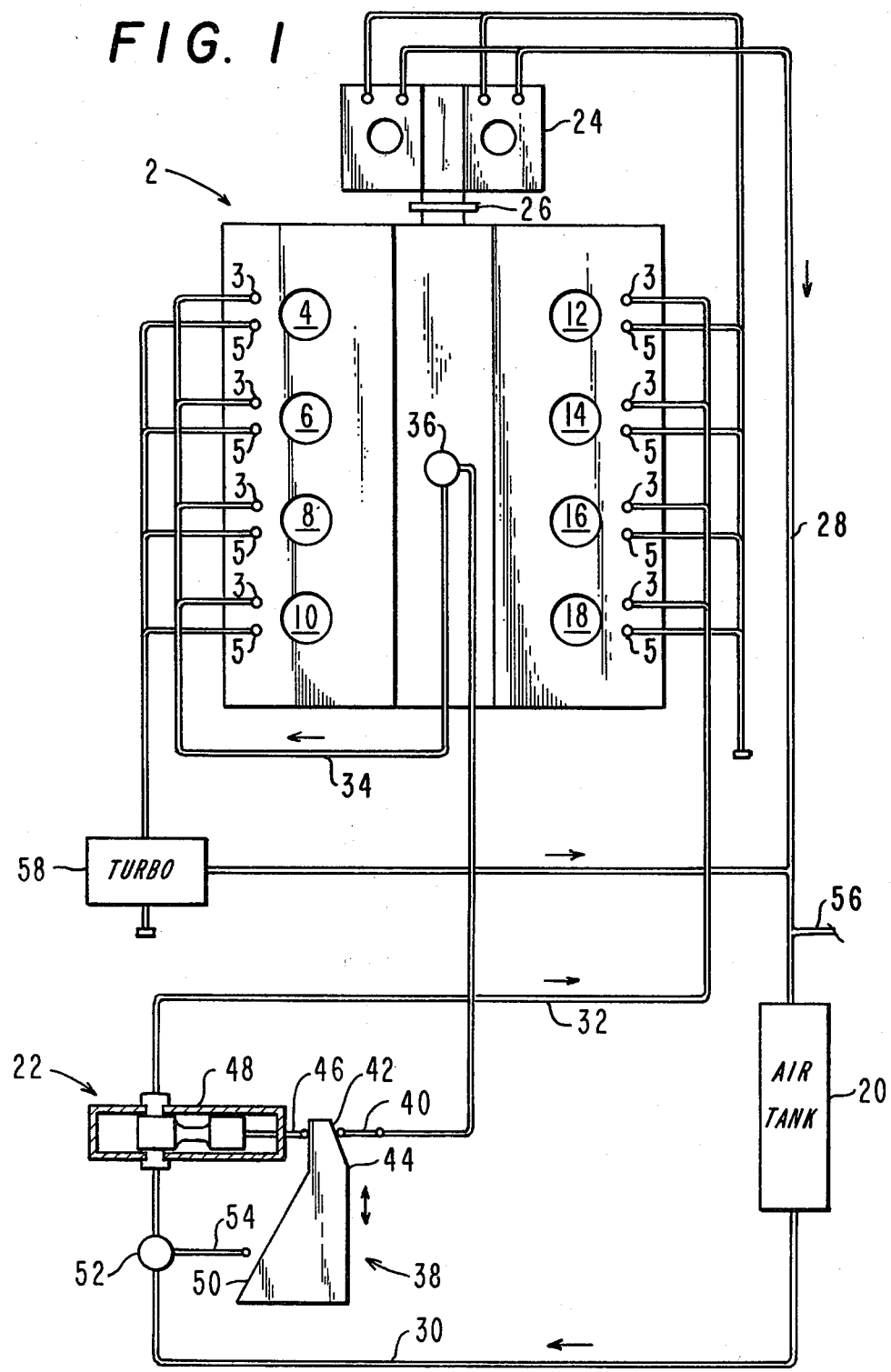
FIG. 1 is a schematic diagram, partly in cross-section showing the engine according to the preferred embodiment of the invention.

Referring now to FIG. 1, engine 2 is an eight (8) cylinder engine so fashioned to have four (4) cylinders which are conventional gas-fired cylinders and four (4) cylinders which are propelled by a fluid such as compressed air.

The firing order of the cylinders may have any predetermined order; however, it is desirable for the firing order of the cylinders to be such that the engine would run if only the four (4) cylinders fired by gas are used or only the four (4) cylinders utilizing air are used.

In this embodiment of the invention, the four (4) cylinders 4, 6, 8 and 10 are gasoline-fired. Cylinders 12, 14, 16 and 18 are compelled by a compressed fluid such as air. The firing order as between the eight (8) cylinders is conventional.

Compressed air from tank 20 flows through air regulator-gas throttle device 22 and into cylinders 12 through 18. The compressed air is distributed to the said cylinders through lines 30 and 32. The compressed air expands in the cylinder and imparts its energy via the piston to the drive shaft of the engine.

Compressor 24 is rotatably engaged with engine 2. As the output shaft 26 rotates, the compressor's output, compressed air, is fed back into tank 20 via line 28. The air expelled from cylinders 12 through 18 is expelled into the input line of the compressor. This produces an increased pressure at the input of the compressor to thus increase what would otherwise be its efficiency.

The gas-fired cylinders 4 through 10 impart their thrust to the same drive shaft as cylinders 12 through 18. Gas passes to the cylinders through fuel line 34 from carburetor 36. The fuel storage tank is not shown.

In this particular embodiment, the engine runs on gas when it is initially started. After the throttle reaches a predetermined point, the compressed air is valved on to supplement the gas-fired cylinders. This may be better understood by reference to the engine air regulator-gas throttle device 22.

Accelerator pedal 38 engages the carburetor control lever 40 along sloping surface 42. As the accelerator is advanced, control lever 40 is activated to cause the carburetor to introduce more gas into the engine 2.

When lever 40 reaches shoulder 44, there is no further increase in the gas supply. Thereafter the gas remains constant. Concurrent with the aforesaid maximization of the gas supply or shortly therebefore, the valve stem 46 of air valve 48 is engaged by ramp 50. At this point and time, compressed air is permitted to flow from tank 20 to cylinders 12 thru 18. Further advance of the accelerator pedal 38 increases the air flow and provides more energy to engine 2 to thus propel the vehicle.

Yet further advance of the pedal 38 will cause angled surface 50 to engage pressure regulator 52 at its actuator 54. This device may be a computerized regulating device for pressure control or mechanical in nature to act to increase the pressure supplied to engine 2 since by this time air valve 48 is entirely open.

As can be appreciated from the foregoing description, the engine functions as a four (4) cylinder engine with a governor which regulates the maximum amount of gas that may be supplied to the engine. This maximum level is well below the maximum consumption level of the engine. Accordingly, the operating-combustion efficiency is maximized.

The compressed fluid (air)-driven cylinders provide propulsive effect to supplement the gas-driven cylinders to thus permit the engine to produce similar spaced-attainment characteristics as would have been obtained from a conventional eight (8) cylinder gas engine but with greatly increased efficiency.

As the engine is operating, even while idling or waiting at a traffic light, there is produced by compressor 24, a supply of compressed air which is fed to tank 20. Bleed valves 56 may be provided to prevent the pressure at the output of the compressor from over charging the storage tank. Also, as described hereinafter, it has been discovered that a turbo 58 may be placed in the exhaust line from the gas-fired cylinders to produce compressed air for supplementing the compressed air supplied by compressor 24.

Figure 2:
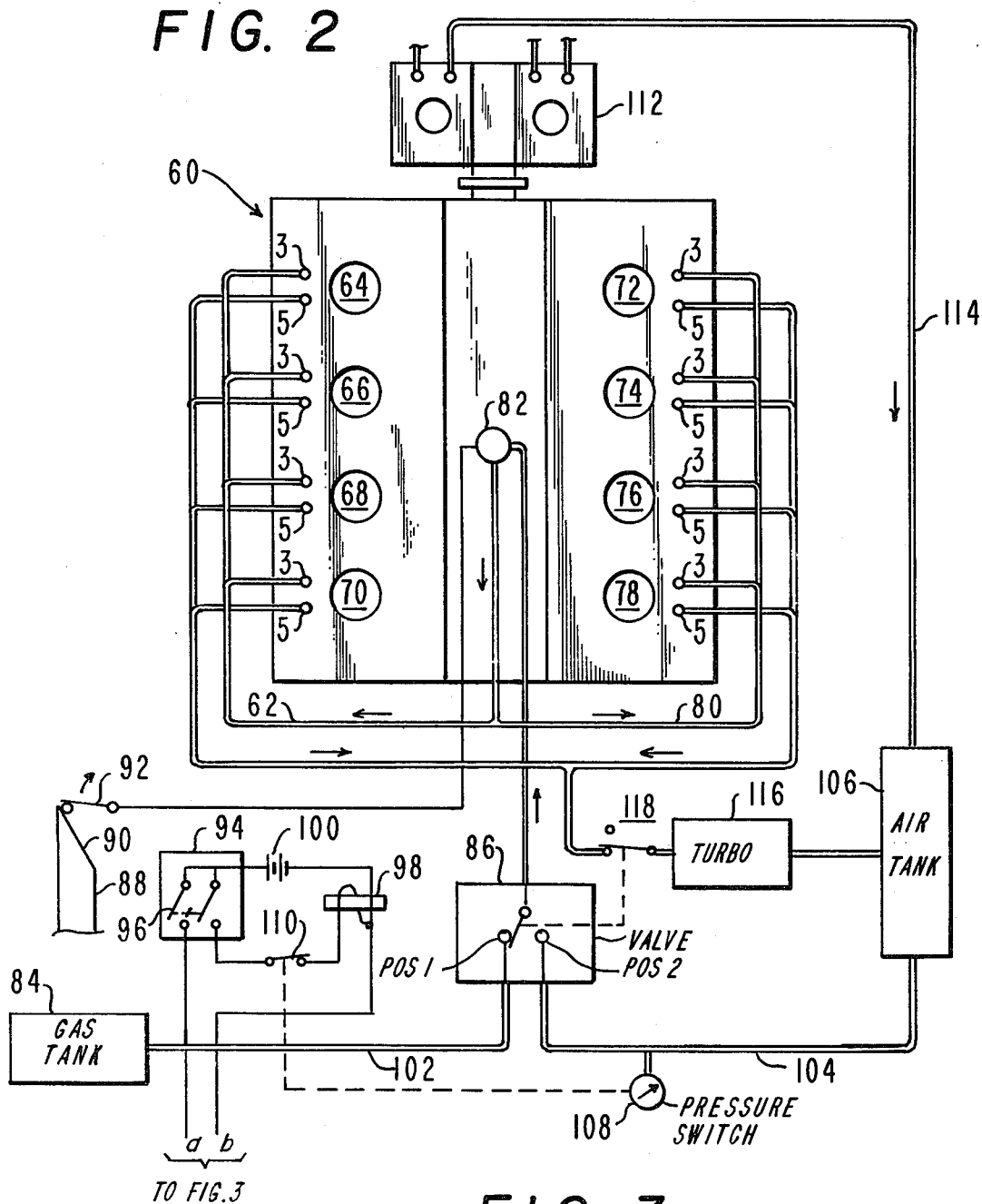
FIG. 2 is a schematic diagram of yet another embodiment of the present invention wherein the engine may be operated entirely from air or gas.

Referring now to FIG. 2, there is shown an engine 60 which, typically, has eight (8) cylinders 64, 66, 68, 70, 72, 74, 76 and 78. The cylinders are so connected that they may be alternately connected to gas or compressed air.

Compressed air supply lines 62 and 80 also act to transport gas when the carburetor 82 is in communication with the gas supply tank 84 via valve 86. Valve 86 is a two-position valve that acts to either communicate gas or compressed air to carburetor 82.

Gas pedal/accelerator 88 has a sloping surface 90 which interacts with lever 92 to cause the gas or compressed air supplied to carburetor 82 to be increased as the pedal is advanced. As the speed of the vehicle increases, the governor or speed indicating device 94 acts to close contacts 96. This occurs when the speed of the car reaches a predetermined speed. At this point solenoid 98 is energized via battery 100 to cause valve 86 to switch from gas to air. The gas is supplied from tank 84 via line 102. Compressed air is supplied to valve 86 via line 104.

Should the pressure of the air in tank 106 reach a predetermined minimum, pressure sensitive switch 108 will react to open its contact 110, thus interrupting the circuit to solenoid 98 which in turn causes valve 86 to change from position 2 (compressed air) to position 1 (gas). In this embodiment, the engine is permitted to function on compressed air at higher speeds and to function on gas when the air pressure drops too low or when the car is operating at very low speeds.

Compressor 112 is operatively connected with engine 60. Its output is supplied to air tank 106 via line 114. Turbo 116 is selectively connected to the exhaust of the cylinders when they are burning gasoline and disconnected from the output of the cylinders when the cylinders are connected to compressed air. This is accomplished by switch 118 which is slaved to valve 86. It may be desired to leave the turbo in the exhaust from the cylinders regardless of the medium of their compulsion.

Referring to FIGS. 1 and 2, all cylinders 4 through 18 and 64 through 78 have intake and exhaust valves. These are the same for all valves. All intake valves are noted as 3 and all output valves are noted as 5. These valves function in a conventional manner to admit fluid into the cylinder or exhaust fluid from the cylinder.

It may be desirable to adjust the timing of the intake valve when compressed air is used so that the air is admitted to the cylinder when the piston is at or very near the top of the stroke for that piston. It is not necessary that the already compressed air be further compressed.

Figure 3:
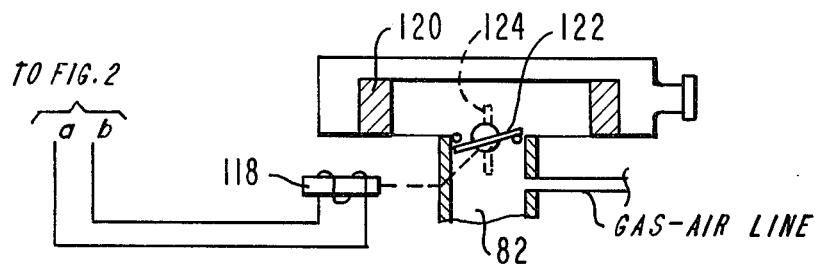
FIG. 3 is a schematic view, partly in cross-section of a portion of a modified carburetor.

Referring now to FIG. 3, solenoid 118 is connected in parallel to solenoid 98 (FIG. 2). Therefore, it is energized when solenoid 98 is energized, i.e., when the valve 86 is in position 2, solenoid 118 is energized. This is the position when compressed air is being supplied.

FIG. 3 depicts a cross-sectional view of air-intake filter 120 and carburetor 82. The carburetor is modified from a conventional carburetor in that it has at its upper-most opening a butterfly valve 122. When compressed air is being supplied it is in the position shown in FIG. 3. When the carburetor is being supplied with gas, the valve 122 is in the position shown in dashed lines and indicated as 124. When compressed air is being supplied, the valve closes the carburetor and causes it to have an air tight chamber.

While the invention has been described with regard to gas, it is contemplated that the combustible fluid may be any such fluid which may be used in a combustion engine, including without limiting, diesel, alcohol or similar forms of fuels.

It is also to be understood that while this invention has been described in relation to an eight (8) cylinder engine, the invention may likewise be used with four (4) or six (6) cylinder engines.

I claim:

1. An engine comprising in combination:
    a plurality of gasoline-fired cylinders operably responsive to gasoline and compressed fluid;
    means for regulating gasoline and compressed fluid supplied to said cylinders, said means being connected to said cylinders and;
    valving means for connecting either gasoline or compressed fluid to said means for regulating gasoline and compressed fluid, said valve being regulated by the speed of said engine and the pressure of the fluid,
whereby said cylinders operate in response to gasoline when gasoline is connected thereto and operate in response to compressed fluid when compressed fluid is connected thereto, and
whereby the means for regulating gasoline and compressed fluid operates to regulate gasoline supplied to said cylinders when gasoline is connected to said means for regulating and operates to regulate compressed fluid supplied thereto when compressed fluid is connected to said means for regulating.

2. An engine comprising in combination:
    a plurality of gasoline-fired cylinders operably responsive to gasoline and compressed fluid;
    a valving means for connecting either gasoline or compressed fluid to said cylinders;
    an engine speed indicating device operably connected to said valving means;
    compressed fluid having a varying pressure;
    an accelerator means for regulating the amount of gasoline or compressed fluid being supplied to said cylinders; and
    a pressure switch means responsive to the pressure of the compressed fluid to be supplied to said cylinders and having an output connected to said speed sensing device;

wherein said speed sensing device causes said valving means to be positioned in a first position to thereby supply gasoline to said cylinders until the speed is advanced to a predetermined point and in a second position thereafter to thereby supply only compressed fluid to said cylinders, provided, however, that should the pressure of said fluid represented by said pressure switch drop below a predetermined minimum, said speed sensing device will cause said valve to be in its first position to supply only gasoline to said engine.

3. An engine comprising in combination:
a plurality of gasoline-fired cylinders operably responsive to gasoline and compressed fluid;
a carburetor for regulating gasoline to said cylinders when gasoline is supplied to said carburetor and for regulating compressed fluid to said cylinders when compressed fluid is supplied to said carburetor; and
valving means having a first position and a second position for selectively connecting either gasoline or compressed fluid to said carburetor, said valving means being positioned by the speed of said engine and the pressure of said compressed fluid, wherein said carburetor further comprises a solenoid-activated butterfly valve positioned in the air intake opening of the carburetor, said solenoid-activated butterfly valve having an open position and a closed position such that when said valving means is in its first position, said butterfly valve is in its open position to thus admit air into said carburetor and in its closed position when said valve is in its second position, to thus prevent air from entering the carburetor thru said air intake opening.

4. An engine comprising in combination:
a plurality of gasoline-fired cylinders comprising intake valves and being operably responsive to gasoline and compressed fluid;
a carburetor having an air intake, an output connected to said intake valves and an input connected to a valving means; and
valving means having a first position and a second position for connecting either gasoline or compressed fluid to the input of said carburetor, said valving means being positioned in response to the speed of said engine and the pressure of the compressed fluid, a solenoid-activated butterfly valve having an open and a closed position, said solenoid-activated butterfly valve being positioned in said air intake of said carburetor such that when said valving means is in its first position to supply gasoline to said carburetor, said butterfly valve is in its open position to thus admit air into said carburetor and in its closed position when said valve is in its second position, to thus prevent air from entering the carburetor through its opening when compressed fluid is being supplied to said carburetor.

5. An engine comprising in combination:
a plurality of gasoline-fired cylinders;
a compressor; and
means for regulating gas and compressed fluids supplied to said cylinders, wherein said cylinders are operated either with gas or with compressed air, said engine further comprising a carburetor, a butterfly valve mounted in the air intake of the carburetor, an accelerator, a two-position valve, a pressure regulated switch, a turbocompressor and an air storage tank, said turbocompressor and said compressor being driven by said engine to provide compressed air for said storage tank, said two-position valve being connected to provide only gas to said carburetor when in its first position and to provide only compressed air to said carburetor when in its second position, said two-position valve being positioned in response to said accelerator and the speed of said engine with said valve being always in position one to supply gas only when the pressure of the air in said storage tank is less than a predetermined minimum, said carburetor being equipped with said butterfly valve at its air intake to prevent air from entering therethru when said valve is in position two and while compressed air is being supplied to said cylinders, said engine being capable of oscillating between gasoline-fired compulsion and compressed air compulsion while operating.

6. An engine as set forth in claim 5 wherein said engine further comprises an exhaust and a connecting means for connecting said turbocompressor into the exhause of said engine only when the engine is being driven by gas and wherein the position of said two-position valve is determined by a speed sensitive switch which closes when the speed exceed a predetermined maximum.

* * * * *